(12) United States Patent
Nettesheim et al.

(10) Patent No.: US 9,649,729 B2
(45) Date of Patent: May 16, 2017

(54) METHOD AND APPARATUS FOR FORMING A STRUCTURE ON A SUBSTRATE

(71) Applicant: Maschinenfabrik Reinhausen GmbH, Regensburg (DE)

(72) Inventors: Stefan Nettesheim, Regensburg (DE); Dariusz Korzec, Wenzenbach (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 14/879,667

(22) Filed: Oct. 9, 2015

(65) Prior Publication Data
US 2016/0031043 A1 Feb. 4, 2016

Related U.S. Application Data

(63) Continuation of application No. PCT/IB2014/060422, filed on Apr. 4, 2014.

(30) Foreign Application Priority Data

Apr. 12, 2013 (DE) .................. 10 2013 103 693

(51) Int. Cl.
*B23K 26/00* (2014.01)
*B23K 26/08* (2014.01)
(Continued)

(52) U.S. Cl.
CPC ............ *B23K 31/02* (2013.01); *B23K 10/027* (2013.01); *B23K 26/144* (2015.10);
(Continued)

(58) Field of Classification Search
CPC B23K 26/00; B23K 26/0006; B23K 26/0066; B23K 26/08; B23K 26/20;
(Continued)

(56) References Cited

U.S. PATENT DOCUMENTS 4,927,992 A * 5/1990 Whitlow ............... B22F 3/1055
219/121.65
5,759,641 A * 6/1998 Dimitrienko ........... C23C 26/02
427/309
(Continued)

FOREIGN PATENT DOCUMENTS

DE 19740205 3/1999
DE 19941563 8/2000
(Continued)

OTHER PUBLICATIONS

Nielsen, Steen.Erik. "Laser fusing—combining laser and plasma spraying techniques for surface improvements," pp. 1-10, Force Technology, Parke Allé 345, DK-2605 Brøndby, Denmark.
(Continued)

*Primary Examiner* — Michael Laflame, Jr.
(74) *Attorney, Agent, or Firm* — Simpson & Simpson, PLLC

(57) ABSTRACT

Presented is a method for forming at least one structure on a substrate. Utilizing a low-temperature plasma jet, powder, of which the structure shall be constructed, is applied to a surface of the substrate. Using at least one laser beam, heat is input into the substrate and/or the powder within a laser incidence region on the substrate. The heat input delays solidification of the powder particles, which are partly or fully melted in the plasma jet, on the substrate and thereby enables the formation of good adhesion between the applied powder, and thus the structure constructed out of the powder, and the substrate. The invention further relates to an apparatus for performing the method.

9 Claims, 4 Drawing Sheets

(51) Int. Cl.
*B23K 25/00* (2006.01)
*B23K 31/02* (2006.01)
*C23C 4/02* (2006.01)
*C23C 4/134* (2016.01)
*B23K 26/144* (2014.01)
*B23K 26/342* (2014.01)
*B23K 10/02* (2006.01)

(52) U.S. Cl.
CPC .............. *B23K 26/342* (2015.10); *C23C 4/02* (2013.01); *C23C 4/134* (2016.01)

(58) Field of Classification Search
CPC .. B23K 26/14; B23K 26/144; B23K 26/1464; B23K 25/00
USPC .......................................... 219/121.6–121.86
See application file for complete search history.

(56) References Cited

U.S. PATENT DOCUMENTS

| | | | | |
|---|---|---|---|---|
| 5,847,357 A | * | 12/1998 | Woodmansee | B05B 7/228 219/121.47 |
| 6,197,386 B1 | | 3/2001 | Beyer et al. | |
| 6,229,111 B1 | * | 5/2001 | McCay | B23K 10/027 219/121.59 |
| 2008/0085368 A1 | * | 4/2008 | Gauthier | C23C 14/28 427/314 |
| 2010/0097082 A1 | * | 4/2010 | Panotopoulos | G01N 27/04 324/693 |
| 2010/0304035 A1 | * | 12/2010 | Zehavi | C23C 4/134 427/450 |
| 2011/0117293 A1 | * | 5/2011 | Durandeau | C03C 17/2456 427/559 |
| 2014/0241937 A1 | | 8/2014 | Hoefener et al. | |

FOREIGN PATENT DOCUMENTS

| | | |
|---|---|---|
| DE | 19941564 | 8/2000 |
| DE | 102007011235 | 9/2008 |
| DE | 102008001580 | 11/2009 |
| DE | 102011052121 | 1/2013 |
| EP | 0903423 | 3/1999 |
| JP | S6369959 | 3/1988 |
| RU | 2010120868 | 11/2011 |
| WO | 2005/031026 | 4/2005 |

OTHER PUBLICATIONS

Zieris, R., et al. "Investigation of AlSi coatings prepared by laser-assisted atmospheric plasma spraying of internal surfaces of tubes," Materials Park, Ohio, ASM International, pp. 567-572, ISBN: 0-87170-785-3, 2003.

Zieris, R. et al. Characterization of coatings deposited by laser-assisted atmospheric plasma. Thermal spray 2003, advancingthe science and applying the technology; proceedings of the 2003 International Thermal Spray Conference. vol. 1, 2003, S. 567-572.

* cited by examiner

METHOD AND APPARATUS FOR FORMING A STRUCTURE ON A SUBSTRATE

CROSS REFERENCE TO RELATED APPLICATIONS

This application is filed under 35 U.S.C. §120 and §365(c) as a continuation of International Patent Application PCT/IB2014/060422, filed Apr. 4, 2014, which application claims priority from German Patent Application No. 10 2013 103 693.7, filed Apr. 12, 2013, which application is incorporated herein by reference in its entireties.

FIELD OF THE INVENTION

The invention relates to a an apparatus and method for forming at least one structure on a surface of a substrate. The structure is formed as a layer from powder.

BACKGROUND OF THE INVENTION

For example, a low-temperature plasma spray method, "PlasmaDust", of company Reinhausen Plasma is known for coating surfaces of substrates. Therein a powder is fed to a low-temperature plasma jet, is partially melted and chemically activated in this plasma jet, and applied by the plasma jet on a surface of a substrate to be coated.

With this technique, it is only possible to achieve line widths of the applied layer not below about 1 millimeter without a mask. Thereby the edges of the lines are not shaped particularly clearly, which is caused by the inhomogeneous density profile of the plasma jet, which is similar to a Gaussian distribution. The usage of masks is laborious and therefore cost-intensive. In particular corresponding masks have to be provided for each desired shape of the layer, even if the number of substrates to be coated is small.

It is known from German patent application DE 10 2008 001 580 A1 to apply the material for a layer as a dispersion of nanoparticles on a surface of a substrate. The nanoparticles applied this way are thermally post-processed by means of a $CO_2$ laser to achieve a desired electric conductivity and transparence of the layer. Regions of the layer, which have not been thermally post-processed, can be removed easily from the surface of the substrate, whereas the regions of the layer, which have been thermally post-processed, adhere very well, compare Zieris R et al., 2003, Characterization of coatings deposited by laser-assisted atmospheric plasma, Materials Park, Ohio: ASM International, pp. 567-572, ISBN: 0-87170-785-3.

High laser power is required for such a thermal post-processing, which can lead to the damage of thermally sensitive substrates.

It is known from the Russian patent application RU 2010 120 868 to illuminate the plasma beam, loaded with powder, by laser light within the plasma nozzle to achieve a better melting of the powder. Since the powder flows through the nozzle after laser irradiation, the laser irradiation does not contribute to the formation of finer structures.

It is known from German patent application DE 10 2007 011 235 A1 to act simultaneously with a laser beam and a plasma jet on a surface. Therein both the laser beam and the plasma jet serve to clean the surface. Coating of the surface by the plasma jet, particularly in cooperation with the laser beam, is not mentioned.

European patent application EP 0 903 423 A2 and German patent DE 197 40 205 B4 describe a method to apply a layer by means of plasma spraying. Thereby at least one continuous laser beam is directed through the spray jet with a given interaction time directly onto the surface of the substrate or the surface of a layer, which has already been applied there, and partially melts it. This method is a high-temperature method using a plasma torch, wherein the high-temperature method is directed at the processing of materials with melting points approximately in the range of 1500-2000° C. The laser beam impinges on the surface of the substrate within the incidence region of the spray jet.

German patent application DE 199 41 563 A1 and German patent application DE 199 41 564 A1 each describe a method for plasma coating using a plasma torch together with a laser. The surface to be coated is locally melted by a laser beam, a plasma beam follows the laser beam and carries the coating material contained in the plasma into the melt. Alternatively the melting with the laser beam can also occur after applying the coating material with the plasma beam.

An overview of the combination of using a laser with a method for plasma spraying can be found in S. E. Nielsen, "Laser fusing—combining laser and plasma spraying techniques for surface improvements".

SUMMARY OF THE INVENTION

The present invention comprises a method for forming at least one structure from a powder on a surface of a substrate, the method having the steps of depositing the powder on the surface of the substrate by a low-temperature plasma jet during a relative movement between the low-temperature plasma jet and the substrate wherein the low-temperature plasma jet defines a plasma incidence region on the substrate, directing at least one laser beam onto the substrate and thereby defining a laser incidence region, wherein a defined relative position between the laser incidence region of the at least one laser beam and the plasma incidence region of the low-temperature plasma jet is given, and, causing a heat input in the substrate and/or the powder by the at least one laser beam in the laser incidence region.

The present invention also comprises an apparatus for forming at least one structure on a surface of a substrate, the apparatus having a processing head, a nozzle of processing head for forming a low-temperature plasma jet and thereby defining a plasma incidence region of the low-temperature plasma jet on the substrate, a powder feed for feeding a powder into the low-temperature plasma jet or into the plasma for generating the low-temperature plasma jet, and, at least one laser emitter directed a laser beam onto the substrate and thereby defining a laser incidence region of the laser bean on the substrate, wherein the at least one laser emitter is arranged in such a way with respect to the processing head so that a defined relative position between the laser incidence region of the laser beam and the plasma incidence region of the low-temperature plasma jet is set on the substrate.

A general object of the present invention is to provide a method, by which a structure can be formed easily and cost-effectively on a surface of a substrate. Therein structures shall also be possible, whose typical dimensions are significantly below 1 millimeter.

Another object of the present invention is to provide an apparatus with which a structure can be formed easily and cost-effectively on the surface of a substrate. Therein structures shall also be possible, whose typical dimensions are significantly below 1 millimeter.

In the plasma the powder particles exist in a partially or fully melted state, in the latter case, therefore, as a droplet.

In order for a sufficient adhesion to form between such a powder particle and a surface of the substrate, it is necessary for material of the powder particle to spread on the surface; an increase of the contact area between the material of the powder particle and the surface of the substrate improves the adhesion of the powder particle on the substrate. In order to enable such a spreading of material of the powder particle on the surface of the substrate, the powder particle has to stay, after impact on the surface, in a partially or fully melted state for a sufficient time, so that material of the powder particle can spread on the surface.

If the surface of the substrate is too cold, with at least thermal conductivities of the substrate and the melted powder material, a difference in temperature between the powder particle and the substrate, the heat transfer between the substrate and the melted powder material, the melting temperature of the powder as well as the heat capacity of the powder particle playing a role, the melted material solidifies too quickly, so that a sufficient spreading of this material is not possible.

The basic idea of the invention is to cause a directed heat input into the surface of the substrate or into the powder applied on the surface of the substrate by at least one laser beam, so that a solidification of the melted material of powder particles on the surface is delayed. Directed heat input means here that only a defined, as the case may be spatially tightly limited, region of the surface of the substrate, which region is to be coated for forming the structure, is exposed to the laser beam, and that the laser irradiation occurs also in immediate temporal vicinity of the coating, so that damaging the substrate by an unnecessarily long exposure of a location on the substrate to the laser is avoided; likewise avoided in this way is so great a drain of the amount of input heat from the defined region before coating that the heat input can no longer show the desired effect.

The application of the material for the structure on the surface of the substrate, on which the structure is to be built by coating the surface, occurs by a plasma jet, to which the material is added as a powder. This plasma jet is a low-temperature plasma jet. Feeding the powder to the plasma of the plasma jet can occur in any way known by the skilled person for plasma spray methods. The powder can also be fed to the plasma, before forming the plasma jet; feeding the powder to the gas from which a plasma is generated is also conceivable. For applying the powder on the surface of the substrate, the low-temperature plasma jet and the substrate are moved relatively to each other, so that at least the defined region of the surface of the substrate, which the structure is to be formed on, is impinged with the powder.

For achieving a directed heat input into the defined region to be coated of the surface of the substrate, i.e. the defined region, on which the structure is to be formed, at least one laser beam is used, which is directed onto the substrate, as said before. This results in a laser incidence region of the at least one laser beam on the substrate; therein, the substrate also can already have been impinged with powder, in which case the laser beam primarily impinges on the powder on the substrate. The low-temperature plasma jet impinges on the substrate in a plasma incidence region. At any given point of time the laser incidence region on the substrate is that region of the substrate or of the powder applied on the substrate, which is impinged by laser radiation at this point of time. A location on the substrate or on the powder applied on the substrate, which is not impinged by laser light at the given point of time, is not included in the laser incidence region. An analogous definition applies for the plasma incidence region. The at least one laser beam is directed onto the substrate such that a defined relative position between the laser incidence region and the plasma incidence region is given. The laser incidence region is always located within the defined region to be coated and is moved across it. The amount of the heat input within the laser incidence region can be influenced for example by the power of the laser beam and the velocity, at which the laser is moved across the surface of the substrate.

Outside of the defined region, i.e. where no heat input by the laser occurred, no sufficient adhesion can be formed between the surface of the substrate and the powder particles applied there by the plasma jet, for the reasons mentioned above. Consequently, these powder particles, which are located outside of the defined region, can be removed easily from the surface. In this way structures of reduced typical size scale, down to 50 micrometers, can be formed, even without using masks. An example for a typical size scale is the width of a coating applied as a line. Building a sufficient adhesion only within the defined region also results in more clearly shaped edges of these lines; the lines have a rectangular cross section, in contrast to the line profile similar to a Gaussian shape, which is obtained with the abovementioned PlasmaDust method.

In one embodiment of the method, the defined relative position between the laser incidence region and the plasma incidence region is such that the laser incidence region is located outside of the plasma incidence region and is not impinged with powder. In this embodiment, the powder particles impinge in a partially or fully melted state on the surface of the substrate. A heat input occurred within the defined region to be coated of the surface by the laser beam, which causes a temperature rise of the substrate within the defined region, so that a difference in temperature between the powder particles and the substrate is reduced within the defined region. Therefore the heat drain from the powder particles to the substrate is reduced, and the solidification of melted material of the powder particles is delayed compared with powder particles applied outside of the defined region. A requirement for the method in this embodiment evidently is that the substrate absorbs the laser light in an extent, which is sufficient to achieve the required heat input into the substrate.

In a further development of this embodiment, the at least one laser beam is directed such that it does not traverse the low-temperature plasma jet. The absorption characteristics of the powder particles for laser light are insignificant in this embodiment of the inventive method.

In another further embodiment of the previously discussed embodiment, the at least one laser beam is directed such that it traverses the low-temperature plasma jet. Therefore in this development of the method an additional heat input can occur into powder particles passing through the laser beam in the plasma jet, insofar as these powder particles are able to absorb the laser light. The additional heat input into the powder particles contributes to delaying the solidification of the melted material of these powder particles after their impact on the defined region of the surface of the substrate.

In a further embodiment the laser incidence region overlaps with the plasma incidence region. The laser incidence region may be fully or partially located within the plasma incidence region. Therefore, in this embodiment, at least a part of the laser radiation impinges on powder within the laser incidence region, which has already been applied on the surface of the substrate. It is a requirement for this embodiment that the powder particles absorb the laser light, and the method can also be applied if the substrate itself is transparent for the used laser light to such an extent that a sufficient heat input into a defined region of the surface of the substrate by direct absorption of laser light by the substrate is not possible. The powder within the laser incidence region absorbs the laser radiation. The heat input into a powder particle caused in this way counteracts the heat drain from the powder particle to the substrate. Thus, in this embodiment, too, the solidification of melted material of the powder particle is delayed compared with a powder particle applied outside of the defined region.

If the relative position of the laser incidence region and of the plasma incidence region is such that the laser incidence region is located partly within and partly outside of the plasma incidence region, wherein furthermore the part of the laser incidence region outside of the plasma incidence region has not yet been impinged with powder, an effect results, which can be seen as combination of the effects of the previously described embodiments. On the one hand, a difference in temperature between powder particles and a defined region to be coated is reduced by the effect of the laser beam on the substrate itself. On the other hand the heat drain from these powder particles to the substrate is counteracted by the part of the laser beam impinging on powder particles which have already been applied on the surface of the substrate.

It would be conceivable to use at least two laser beams, of which at least one forms a part of the laser incidence region, which is located fully outside of the plasma incidence region, and of which at least one forms a part of the laser incidence region, which is located fully within the plasma incidence region. Thus, in this case the laser incidence region is not connected.

In one embodiment of the method, a diameter of the laser incidence region is smaller than the diameter of the plasma incidence region. Since laser radiation can be focused to regions of smaller diameter than possible with plasma jets, it is possible with this embodiment of the method, to generate structures with typical size scales, e.g. lines with a width, which are significantly below the size scales or the width, which can be generated by a plasma jet without a mask. With this embodiment of the method, line widths can be generated down to 50 micrometers, whereas line widths below 1 millimeter are hardly possible with a plasma jet alone, without masks.

As mentioned above, a laser beam can be focused on a region of smaller diameter than a plasma jet. Therefore when forming structures with correspondingly small dimensions, for example lines with a width smaller than the diameter of the plasma incidence region, powder is initially applied by the plasma jet also to regions of the substrate, which are located outside of the defined region to be coated. Therefore, the powder is located outside of the structure formed by the cooperation of the laser beam and the plasma jet on the substrate. From the introductory remarks on forming the adhesion of the powder particles on the substrate it follows that the particles deposited outside of the structure adhere to the substrate at best weakly. Such particles can be removed easily from the surface of the substrate, e.g. blown off, so that only the structure constructed on the substrate remains. Sometimes the particles which are applied outside of the defined region to be coated and which solidify quickly are already swept away by the gas stream of the plasma jet itself.

The method is not limited to planar substrates, but can be applied to arbitrarily designed substrates.

The apparatus according to the invention for forming at least one structure on a surface of a substrate has a processing head, which has a nozzle for forming a low-temperature plasma jet. A known plasma generator is used for generating a low-temperature plasma. The apparatus according to the invention further comprises a powder feed, with which the powder out of which the structure is to be formed, can be fed to the plasma jet itself or to the plasma out of which the plasma jet is yet to be formed, or to the gas out of which the plasma should be generated. At least one laser emitter is mounted to the processing head, according to the invention. The mounting is such that a laser beam from the laser emitter can be directed onto the substrate such that a defined relative position between a laser incidence region of the laser beam on the substrate and a plasma incidence region of the low-temperature plasma jet on the substrate can be achieved. For instance, the laser emitter can be attached to the processing head such that the laser beam is emitted under a defined angle to the central axis of the plasma jet, which results in a defined relative position between the laser incidence region and the plasma incidence region. In one embodiment, the laser emitter is a laser mounted on the processing head. The laser can be a semiconductor laser, for example.

Alternatively the laser light of the at least one laser beam can be guided through at least one optical fiber to the processing head. The laser light is coupled out at the processing head from the at least one optical fiber. Herein the laser emitter is an end of the optical fiber, where the end is attached to the processing head. Embodiments of the invention use coupling-out optics for coupling out the laser light from the optical fiber.

These embodiments of the apparatus have the advantage that a fixed geometric relation between the plasma jet and the at least one laser beam is settable by mounting the laser or an end of the optical fiber, respectively, if necessary enclosing a coupling-out optics, on the processing head, so that also a defined relative position between the laser incidence region and the plasma incidence region is settable in an easy manner.

According to a further embodiment, the laser emitter is mounted in an adjustable manner on the processing head. The adjustment is carried out by an operator or by actuators as a result of control signals, which are generated by a user of the apparatus or by a control system; this may be possible during formation of a structure on a substrate, as well.

In another embodiment, at least one movable reflector is provided to guide the laser beam across the substrate. The at least one movable reflector is controllable such that the laser incidence region describes the desired path on the substrate within the defined region to be coated. In such an embodiment, a fixed geometric relation between the plasma jet and the at least one laser beam is not mandatory, this geometric relation is changeable by controlling the at least one reflector. It is also conceivable, that at least one controllable, movable reflector for the laser light is attached to the processing head itself.

Geometric relation between the plasma jet and the at least one laser beam can be understood, for example, as an angle between the at least one laser beam and the plasma jet. More generally, geometric relation between the plasma jet and the at least one laser beam can be understood as a relative path of the plasma jet and the at least one laser beam, which relative path also determines the relative position between the plasma incidence region on the surface of the substrate and the laser incidence region on the surface of the substrate. This relative position can be adapted depending on the embodiment of the method and on, for example, powder and substrate, for instance material or shape of the substrate or further parameters.

The apparatus furthermore comprises a means with which a relative movement between the substrate and the processing head can be generated. Thus a robotic arm can be provided to move the processing head relatively to the substrate, alternatively, for example, a gantry robot can be used. It is possible, as well, to place the substrate on a movable stage or a robot can move the substrate relatively to the plasma jet.

In particular, the apparatus according to the invention is suitable for executing the method according to the invention.

These and other objects, advantages and features of the present invention will be better appreciated by those having ordinary skill in the art in view of the following detailed description of the invention in view of the drawings.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

Figure 1:
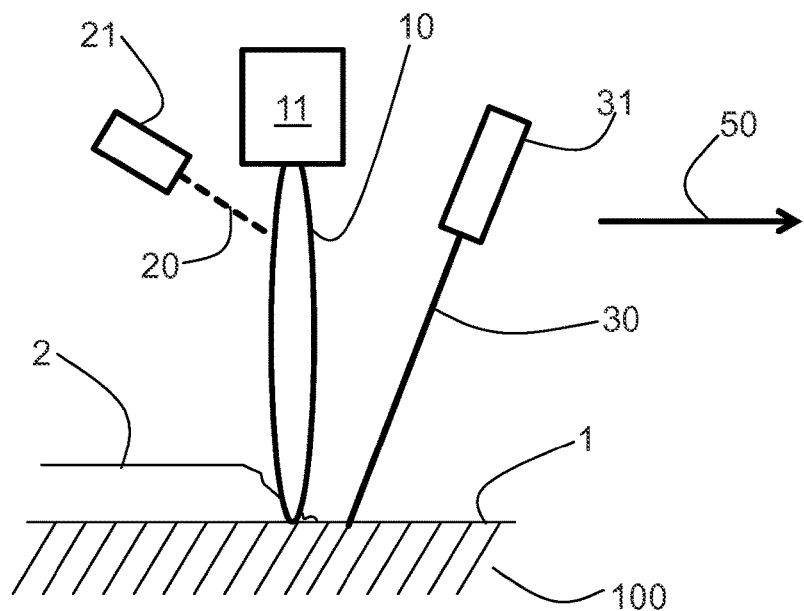
FIG. 1 is a first embodiment of the method, where the laser beam is guided before the plasma jet.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. Also, it is to be understood that the invention is not limited in its application to the details of construction and the arrangement of the components set forth in the following description or illustrated in the drawings. The invention is applicable to other embodiments or of being practiced or carried out in various ways and is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims. The invention expressly also covers the combinations of features of the embodiments described.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 shows a first schematic embodiment of the method and the apparatus according to the invention for forming a structure 2 on a substrate 100. A powder 20 is supplied to a low-temperature plasma jet 10 and deposited on a surface 1 of the substrate 100 by the plasma jet 10. The powder 20 is fed to the plasma jet 10 by a powder feed 21, which here is shown only schematically. The plasma jet 10 exits from a processing head 11, which is connected to a plasma generator, which is not shown here. A laser beam 30, generated here by a laser 31, is directed onto the surface 1 of the substrate and there defines a laser incidence region 35 (see FIG. 2) in a region, which has not yet been impinged with powder 20 by the plasma jet 10. The arrangement of processing head 11, laser 31 and powder feed 21 is guided and moved respectively in the direction of arrow 50 relatively to the surface 1 of the substrate 100. Thus also the plasma jet 10 and the laser beam 20 are guided in the direction of arrow 50 relatively to the surface 1 of the substrate 100.

In this and the following figures the powder 20 is fed to the plasma jet 10 outside of the processing head 11. However, this is a not limiting factor of the invention. The powder 20 may be fed to the plasma eventually forming the plasma jet 10 in any way known to the person skilled in low-temperature plasma spraying. Likewise, it is not limiting to the invention that the laser beam 30 is directed onto the substrate 100 directly by the laser 31 and that the laser 31 is moved relatively to the surface 1. It is relevant for the method that the laser beam 30 impinges on the substrate 100 and that the laser beam 30 moves relatively to the surface 1, irrespectively of where the laser beam 30 is generated and how it is eventually directed onto the substrate 100.

Figure 2:
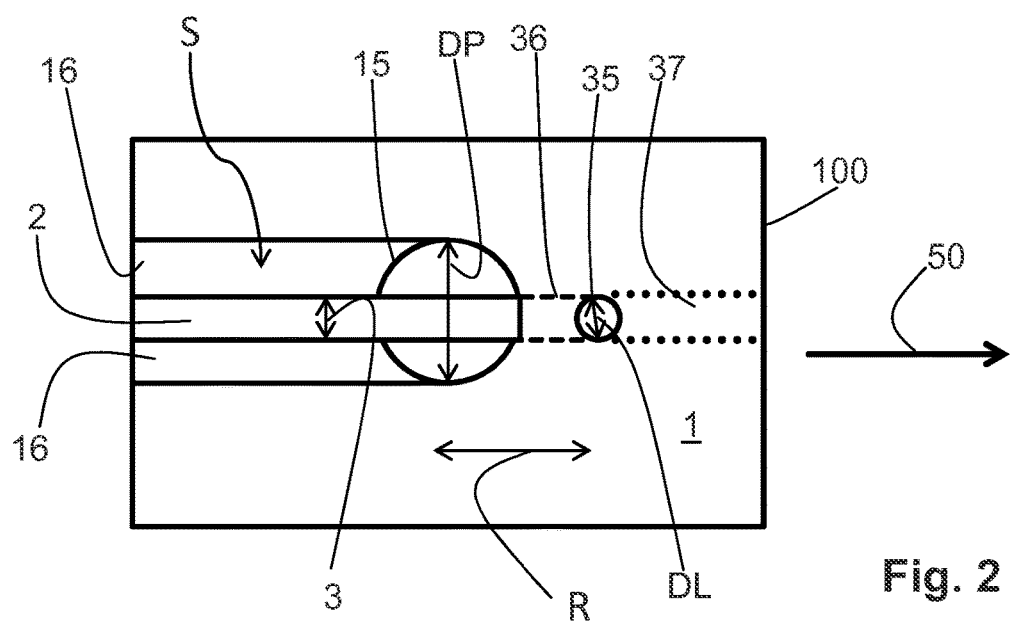
FIG. 2 shows a top view onto a surface of the substrate, which is subjected to the embodiment of the method of FIG. 1.

FIG. 2 shows a top view of a surface 1 of a substrate 100; the top view corresponds to an embodiment of the method as shown in FIG. 1. The laser incidence region 35 is shown, i.e. the region in which the laser beam 30 (see FIG. 1) impinges on the substrate 100; the shown circular shape of the laser incidence region 35 is not limiting to the invention. A part of a defined region 37 to be coated is also shown. The laser incidence region 35 is guided in the direction of arrow 50 across the defined region 37 and causes a heat input into the substrate 100 there. Therefore the laser incidence region 35 leaves behind a preheated region 36 on the surface 1 of the substrate 100, when moved in direction of arrow 50, wherein the preheated region 36 has not yet been impinged with powder 20 (see FIG. 1). The plasma jet 10, shown in FIG. 1 impinges on the surface 1 of the substrate 100 in a plasma incidence region 15 shown here to be of circular shape; however this circular shape is not limiting to the invention. The laser incidence region 35 and the plasma incidence region 15 have a defined relative position R to each other. The preheated region 36, which has not yet been impinged with powder 20, is located between the plasma incidence region 15 and the laser incidence region 35. If the plasma jet 10, and therefore also the plasma incidence region 15, is moved in direction of arrow 50 across the surface 1, a powder 20 is deposited along a trace S of the plasma incidence region 15 on the surface 1. With this movement the plasma incidence region 15 also sweeps over the respective preheated region 36, since the plasma jet 10 follows the laser beam 30. The plasma incidence region 15 follows the laser incidence region 35. According to the explanations above, a good adhesion can develop between the powder 20 deposited in the preheated region 36 and the surface 1 of the substrate 100, since, among other things, a difference in temperature between the powder particles in the plasma jet 10 and the preheated region 36 is reduced by preheating the region 36. Thus the structure 2, shaped here as a line with a width 3, is finally formed on the surface 1 of the substrate 100.

Such a decrease of the difference in temperature between the powder particles in the plasma jet 10 and a corresponding region 16 does not occur in regions 16 outside of the preheated region 36, so that a good adhesion of the powder particles on the substrate 100 does not develop in the regions 16. The deposited powder 20 can be easily removed from these regions 16 by known methods.

As mentioned at the beginning, line widths 3 are possible with the method according to the invention which are significantly smaller than the line widths achievable by a low-temperature plasma jet alone, i.e. without using a laser beam. This is so, because focusing the laser beam 30 on corresponding smaller diameters, which correspond approximately to the desired line width 3, is easier than a corresponding focusing of the plasma jet 10. Accordingly, in FIG. 2, a diameter DP of the plasma incidence region 15 is shown larger than a diameter DL of the laser incidence region 35.

Figure 3:
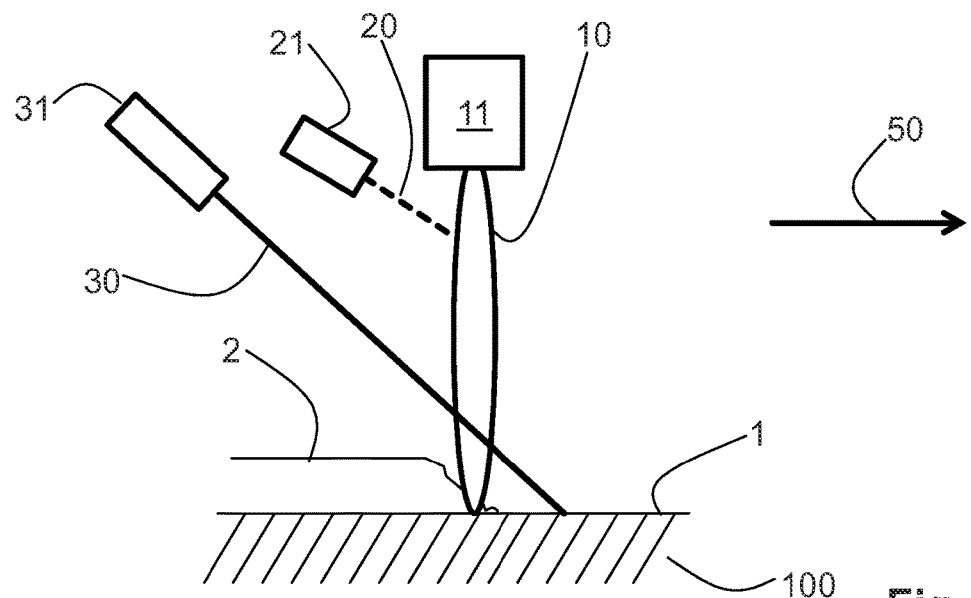
FIG. 3 shows a second embodiment of the method, where the laser beam traverses the plasma jet.

FIG. 3 to a large extent corresponds to FIG. 1. However, in the embodiment shown in FIG. 3, the laser beam 30 is directed through the plasma jet 10 onto the surface 1 of the substrate 100. The laser beam 30 impinges on the surface 1 of the substrate 100 outside of the plasma jet 10. In a top view an arrangement like in FIG. 2 would result. In the embodiment of the method shown in FIG. 3, a laser incidence region 35 defined by the laser beam 30 on the substrate 100 is located, relative to the direction of movement 50, in front of the plasma incidence region 15, so that the plasma jet 10 follows the laser incidence region 35 in this embodiment, too. In addition to a heat input into a region of the substrate 100, the laser beam 30 here can also heat powder particles which traverse the laser beam 30 within the plasma jet 10. This additional heating of the powder particles leads to a delay of the solidification of the powder particles after their impact on the substrate 100, as already mentioned above.

Figure 4:
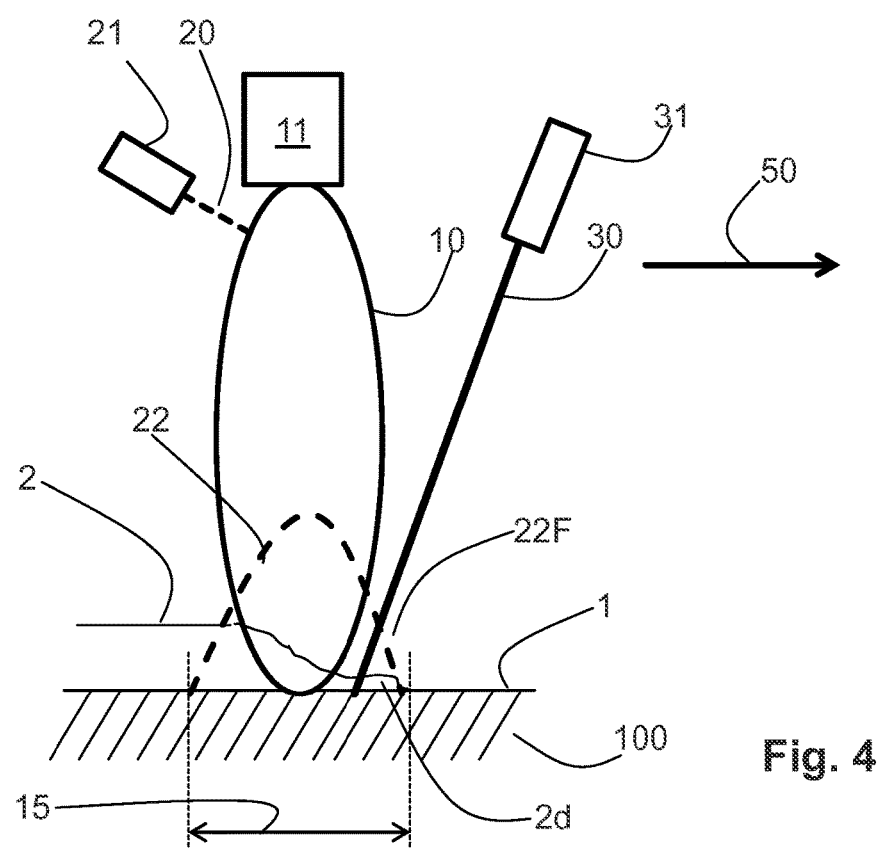
FIG. 4 shows a third embodiment of the method, where the laser beam is directed into the plasma jet.

FIG. 4 shows a further embodiment of the method and apparatus, which are similar to the one shown in FIG. 1. Most of the elements shown have already been discussed in the context of FIG. 1. For clarity reasons, plasma jet 10 and laser beam 30 have been shown larger compared with FIG. 1. Furthermore, a density profile 22 of the powder 20 in the plasma jet 10, and the plasma incidence region 15 determined by the density profile 22 are shown in FIG. 4. In this embodiment, the laser beam 30 is directed onto a region of the surface 1 of the substrate 100, which has already been impinged with powder 20. More precisely, the laser beam 30 is directed into the plasma jet 10 such that it impinges on a leading slope 22F of the density profile 22, if considered in direction 50 of a movement of the plasma jet 10 relative to surface 1. Therefore a thin powder layer 2d, which has already been deposited on the substrate 100 in this leading slope 22F, is impinged with laser radiation. This leads to a heat input into the powder particles in the thin powder layer 2d. This heat input counteracts the heat drain from these powder particles to the substrate 100 und therefore delays a solidification of the melted material of the powder particles, as mentioned above, so that finally the well adhering structure 2 is built on the surface 1 of the substrate 100.

Figure 5:
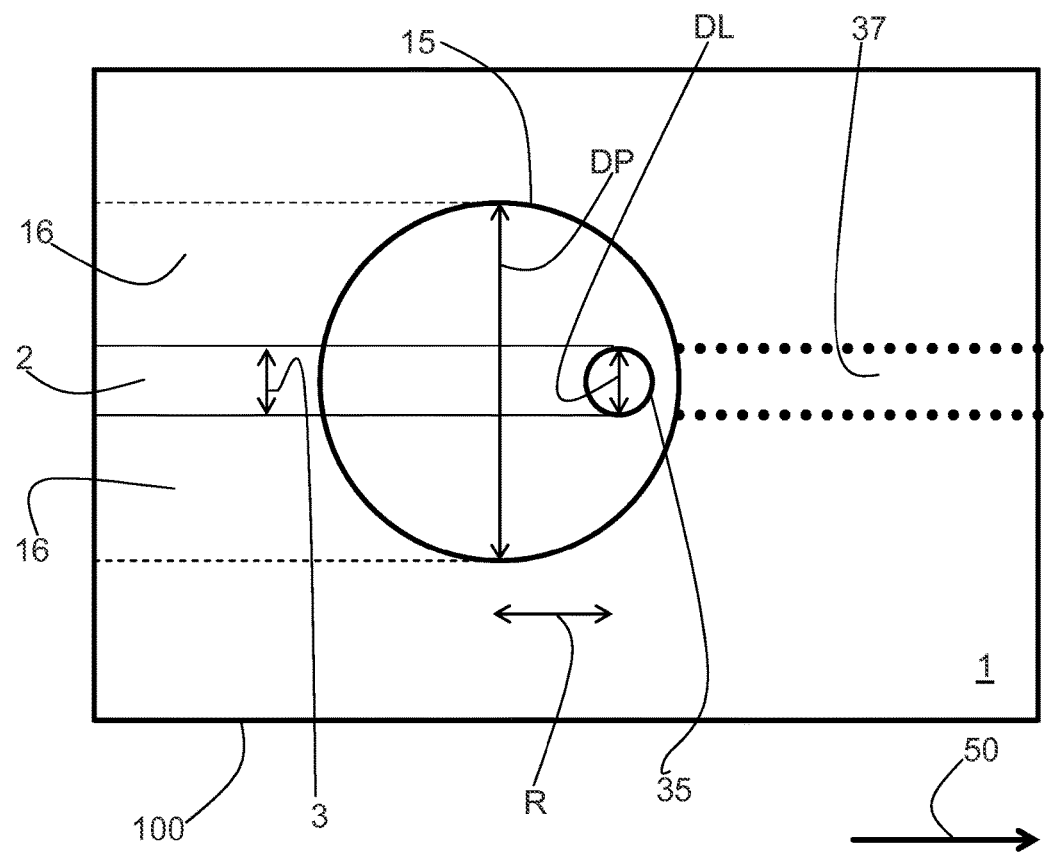
FIG. 5 shows a top view similar to FIG. 2, wherein the substrate, which is subjected to the embodiment of the method as shown in FIG. 4.

FIG. 5 shows a top view of the surface 1 of the substrate 100, corresponding to an embodiment of the method shown in FIG. 4. All elements shown have already been discussed in FIG. 2, which is a corresponding representation for an embodiment of the method shown in FIG. 1. In contrast to FIG. 2, the laser incidence region 35 is located within the plasma incidence region 15 in FIG. 5. A preheated region 36, like in FIG. 2, does not exist here, since the heat input in the laser incidence region 35 occurs, as shown in FIG. 4, into powder which has already been deposited on the surface 1. A requirement for the embodiment shown in FIGS. 4 and 5 is that the powder 20 is able to absorb the laser light sufficiently. The substrate 100, on the other hand, may be transparent for laser light in this embodiment.

Figure 6:
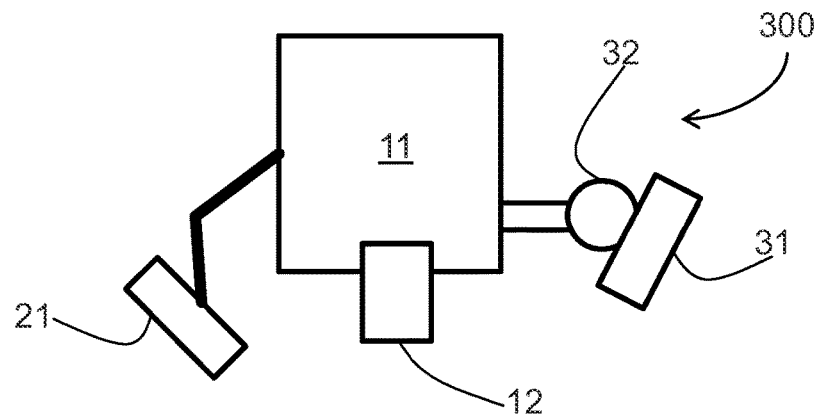
FIG. 6 shows an embodiment of the device according to the invention.

FIG. 6 shows an embodiment of the apparatus 300 according to the invention. A processing head 11 has a nozzle 12 for forming a plasma jet 10 out of a plasma. A plasma generator known to those skilled in the art may be used for generating the plasma. A laser 31 is attached to the processing head 11. The laser 31 is adjustable by an actuator 32, so that in particular the relative position R between the plasma incidence region 15 and the laser incidence region 35 discussed above can be set. The laser may be a semiconductor laser.

Figure 7:
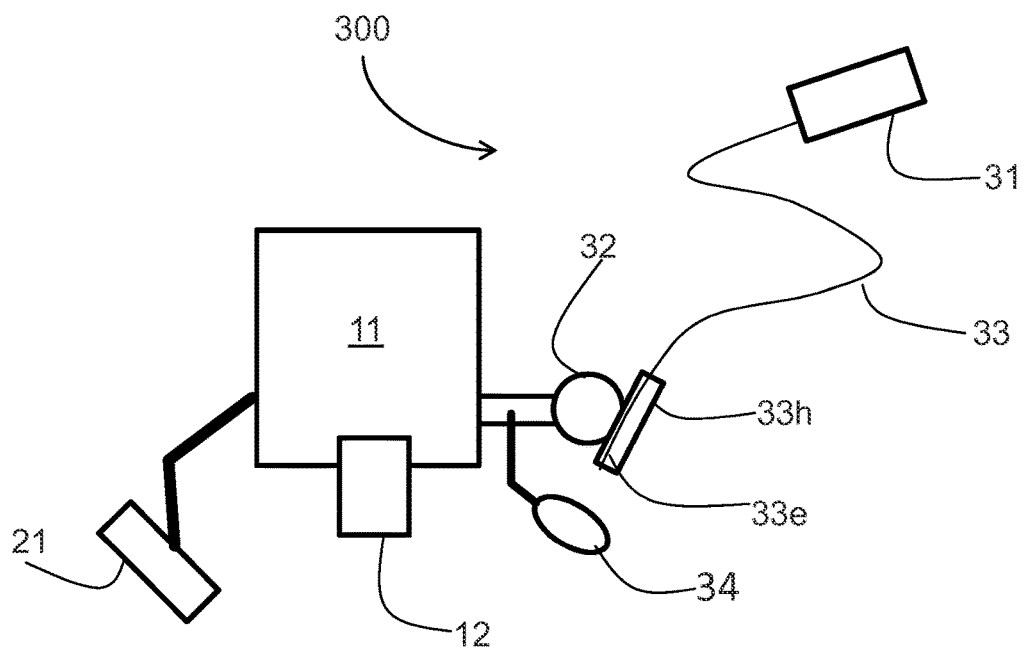
FIG. 7 shows a further embodiment of the device according to the invention.

FIG. 7 shows a further embodiment of the apparatus 300 according to the invention. Some of the depicted elements have already been discussed in the context of FIG. 6. An end 33e of an optical fiber 33 is attached to a holder 33h on the processing head 11. The holder 33h is adjustable by an actuator 32, so that in particular the relative position R between the plasma incidence region 15 and the laser incidence region 35 discussed above can be set. Moreover, this embodiment provides a coupling-out optics 34 for coupling out the laser light from the optical fiber 33. In this embodiment the coupling-out optics 34 is mounted on the processing head 11. The laser light is fed into the optical fiber 33 by a laser 31 in a way known to the skilled person. The laser may be a semiconductor laser.

Thus, it is seen that the objects of the present invention are efficiently obtained, although modifications and changes to the invention should be readily apparent to those having ordinary skill in the art, such modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

What is claimed is:

1. A method for forming at least one structure from a powder on a surface of a substrate, the method comprising the steps of:

depositing the powder on the surface of the substrate by a low-temperature plasma jet during a relative movement between the low-temperature plasma jet and the substrate wherein the low-temperature plasma jet defines a plasma incidence region on the substrate;

directing at least one laser beam onto the substrate and thereby defining a laser incidence region, wherein a defined relative position between the laser incidence region of the at least one laser beam and the plasma incidence region of the low-temperature plasma jet is given; and, causing a heat input in the substrate and/or the powder by the at least one laser beam in the laser incidence region;

wherein a solidification of molten material of the powder is delayed in such a way by the heat input that the molten material can spread on the surface of the substrate; and, wherein the surface of the substrate in the laser incidence region remains in a solid condition when impinged by the at least one laser beam.

2. The method of claim 1, wherein the defined relative position between the laser incidence region and the plasma incidence region is such that the laser incidence region is located outside of the plasma incidence region and has not yet been impinged with powder.

3. The method of claim 2, wherein the at least one laser beam is guided such that it does not traverse the low-temperature plasma jet.

4. The method of claim 2, wherein the at least one laser beam is guided such that it traverses the low-temperature plasma jet.

5. The method of claim 1, wherein the laser incidence region overlaps with the plasma incidence region.

6. The method of claim 5, wherein the laser incidence region is completely located within the plasma incidence region.

7. The method of claim 1, wherein a diameter of the laser incidence region is smaller than a diameter of the plasma incidence region.

8. The method of claim 1, wherein the powder which has been directed by the low-temperature plasma jet on the surface of the substrate outside of the at least one structure formed by a cooperation of the low-temperature plasma jet and the at least one laser beam is removed from the surface of the substrate.

9. The method of claim 7 wherein a diameter of the laser incidence region is smaller than 1 mm.

\* \* \* \* \*